US010666075B2

United States Patent
Hsu et al.

(10) Patent No.: US 10,666,075 B2
(45) Date of Patent: May 26, 2020

(54) NON-NARROW VOLTAGE DIRECT CURRENT CHARGER AND CONTROL METHOD THEREOF

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 162 days.

(21) Appl. No.: 16/044,623

(22) Filed: Jul. 25, 2018

(65) Prior Publication Data

US 2019/0312450 A1  Oct. 10, 2019

(30) Foreign Application Priority Data

Apr. 9, 2018  (TW) .............................. 107112109 A (51) Int. Cl.
*H02J 7/00* (2006.01)
*H02J 7/04* (2006.01)

(52) U.S. Cl.
CPC .......... *H02J 7/0068* (2013.01); *H02J 7/0047* (2013.01); *H02J 7/0077* (2013.01); *H02J 7/00712* (2020.01); *H02J 7/007182* (2020.01); *H02J 7/042* (2013.01); *H02J 7/007188* (2020.01)

(58) Field of Classification Search
CPC ............... H02J 7/0068; H02J 7/007182; H02J 7/00712; H02J 7/0077; H02J 7/042; H02J 7/0047
USPC ....................................................... 320/107
See application file for complete search history.

(56) References Cited

U.S. PATENT DOCUMENTS

| 3,890,556 A | * | 6/1975 | Melling | H02J 7/00718 320/161 |
| 3,936,718 A | * | 2/1976 | Melling | H02J 7/0085 320/156 |
| 5,151,647 A | * | 9/1992 | Frantz | G01R 19/16542 322/11 |
| 5,608,309 A | * | 3/1997 | Hikita | H02J 7/1446 322/28 |
| 5,861,735 A | * | 1/1999 | Uchida | G05F 1/563 323/268 |
| 6,653,820 B1 | * | 11/2003 | Smith | H01M 10/44 320/134 |

(Continued)

FOREIGN PATENT DOCUMENTS

JP  2013078241 A  *  4/2013
KR  20080067081 A  *  7/2008

*Primary Examiner* — Robert Grant
*Assistant Examiner* — John T Trischler
(74) *Attorney, Agent, or Firm* — Li & Cai Intellectual Property (USA) Office (57) ABSTRACT

Disclosed are a non-narrow voltage direct current (NON-NVDC) charger and a control method thereof. In the present disclosure, a proper target voltage, related to a turn-on voltage of a switch circuit, is determined according to an output voltage of a load, a storage voltage of an energy storage device and a turn-on resistance value of the switch circuit. Then, according to the determined target voltage, the NON-NVDC charger can enter a supplement mode at an appropriate time. The NON-NVDC charger can be operated stably and has excellent operation efficiency even when a current flowing through a transformer close to a maximum safe current.

12 Claims, 5 Drawing Sheets

(56) References Cited

U.S. PATENT DOCUMENTS

| | | | | |
|---|---|---|---|---|
| 7,253,590 B2* | 8/2007 | Suzuki | H02P 9/48 | 322/20 |
| 7,379,833 B2* | 5/2008 | Kamishima | G01R 19/32 | 702/104 |
| 7,545,126 B2* | 6/2009 | Su | G05F 1/575 | 323/273 |
| 7,557,459 B2* | 7/2009 | Yamashita | B60L 1/00 | 307/9.1 |
| 7,615,948 B2* | 11/2009 | Atarashi | B60L 3/0023 | 318/400.09 |
| 7,872,452 B2* | 1/2011 | Kaneko | H02J 7/0014 | 320/150 |
| 8,004,232 B2* | 8/2011 | Schultz | H02J 7/0029 | 320/101 |
| 8,081,410 B1* | 12/2011 | Wang | H02J 7/0031 | 361/93.1 |
| 8,140,205 B2* | 3/2012 | Hanyu | B60L 50/16 | 701/22 |
| 8,248,036 B2* | 8/2012 | Sheng | H02J 7/00718 | 320/148 |
| 8,299,755 B2* | 10/2012 | Shiu | H02J 7/0018 | 320/116 |
| 8,362,748 B2* | 1/2013 | Miyanaga | G01R 19/16538 | 320/132 |
| 8,519,802 B2* | 8/2013 | Yang | H03K 7/08 | 320/145 |
| 8,526,204 B2* | 9/2013 | Goto | H02M 3/33592 | 363/21.18 |
| 8,773,104 B2* | 7/2014 | Chen | H02M 3/156 | 323/271 |
| 8,779,747 B2* | 7/2014 | Su | H02M 3/156 | 323/285 |
| 8,928,298 B2* | 1/2015 | Hsiao | H02J 7/1492 | 323/282 |
| 8,957,660 B2* | 2/2015 | Chen | H02M 1/084 | 323/272 |
| 8,963,526 B2* | 2/2015 | Chen | H02M 3/158 | 323/282 |
| 8,964,419 B2* | 2/2015 | Ryoo | H02M 3/335 | 363/21.1 |
| 9,048,675 B2* | 6/2015 | Yang | H02J 7/00 | |
| 9,077,198 B2* | 7/2015 | Szepesi | H02J 7/0068 | |
| 9,274,148 B2* | 3/2016 | Cheng | G01R 19/0084 | |
| 9,283,855 B2* | 3/2016 | Kamioka | B60L 11/14 | |
| 9,283,864 B2* | 3/2016 | Brockerhoff | B60L 11/1848 | |
| 9,413,244 B2* | 8/2016 | Chen | H02M 3/1588 | |
| 9,455,587 B2* | 9/2016 | Schumacher | H02J 7/00711 | |
| 9,490,646 B2* | 11/2016 | Kubota | H02J 7/007 | |
| 9,543,826 B2* | 1/2017 | Chen | H02M 1/44 | |
| 9,543,834 B2* | 1/2017 | Izumoto | H02M 3/156 | |
| 9,570,932 B2* | 2/2017 | Su | H02J 7/00 | |
| 9,577,531 B2* | 2/2017 | Chen | H02M 3/1582 | |
| 9,660,473 B2* | 5/2017 | Li | H02J 7/0077 | |
| 9,831,702 B2* | 11/2017 | Chen | H02M 3/158 | |
| 9,876,381 B2* | 1/2018 | Wang | H02J 7/025 | |
| 9,906,053 B2* | 2/2018 | Chen | G06F 1/263 | |
| 9,966,770 B2* | 5/2018 | Chang | H02J 7/0045 | |
| 10,168,726 B2* | 1/2019 | Chen | G05F 3/262 | |
| 10,171,016 B2* | 1/2019 | Chen | H02P 7/285 | |
| 10,218,195 B2* | 2/2019 | Chen | H02J 7/0072 | |
| 10,283,994 B2* | 5/2019 | Chen | H02J 7/008 | |
| 10,381,820 B2* | 8/2019 | Su | H02H 3/20 | |
| 10,418,917 B2* | 9/2019 | Bergquist | H02J 3/38 | |
| 10,499,474 B1* | 12/2019 | Chen | H05B 45/50 | |
| 10,516,338 B2* | 12/2019 | Gong | H02M 3/33523 | |
| 10,547,193 B1* | 1/2020 | Chen | G01R 31/3835 | |
| 2006/0097703 A1* | 5/2006 | Suzuki | H02P 9/48 | 322/20 |
| 2006/0136163 A1* | 6/2006 | Kamishima | G01R 19/32 | 702/104 |
| 2006/0227584 A1* | 10/2006 | Kuan | H02M 3/158 | 363/132 |
| 2007/0285071 A1* | 12/2007 | Su | G05F 1/575 | 323/282 |
| 2007/0290633 A1* | 12/2007 | Atarashi | B60L 3/0023 | 318/66 |
| 2008/0157721 A1* | 7/2008 | Kaneko | H02J 7/0014 | 320/136 |
| 2009/0066293 A1* | 3/2009 | Miyanaga | G01R 19/16538 | 320/134 |
| 2010/0201317 A1* | 8/2010 | Shiu | H02J 7/0018 | 320/116 |
| 2011/0261589 A1* | 10/2011 | Goto | H02M 3/33592 | 363/15 |
| 2012/0074949 A1* | 3/2012 | Kepley | H02M 3/33584 | 324/426 |
| 2012/0248869 A1* | 10/2012 | Itagaki | H02J 7/1423 | 307/9.1 |
| 2013/0088210 A1* | 4/2013 | Hsiao | H02J 7/1492 | 323/282 |
| 2013/0119759 A1* | 5/2013 | Kamioka | B60L 11/14 | 307/10.1 |
| 2013/0162226 A1* | 6/2013 | Su | H02M 3/156 | 323/234 |
| 2013/0234672 A1* | 9/2013 | Kubota | H02J 7/007 | 320/134 |
| 2013/0265016 A1* | 10/2013 | Chang | H02M 1/08 | 323/271 |
| 2013/0293185 A1* | 11/2013 | Sutton | H02J 7/00 | 320/107 |
| 2013/0293203 A1* | 11/2013 | Chen | H02M 1/084 | 323/234 |
| 2013/0293214 A1* | 11/2013 | Chang | H02M 3/1584 | 323/311 |
| 2014/0055080 A1* | 2/2014 | Ishikura | H02J 7/342 | 320/103 |
| 2014/0146571 A1* | 5/2014 | Ryoo | H02M 3/335 | 363/17 |
| 2014/0163700 A1* | 6/2014 | Lai | H02H 3/044 | 700/22 |
| 2014/0184173 A1* | 7/2014 | Szepesi | H02J 7/0068 | 320/164 |
| 2014/0320098 A1* | 10/2014 | Izumoto | H02M 3/156 | 323/282 |
| 2015/0102779 A1* | 4/2015 | Schumacher | H02J 7/007 | 320/141 |
| 2015/0236536 A1* | 8/2015 | Aradachi | H02J 7/0021 | 320/112 |
| 2015/0239363 A1* | 8/2015 | Brockerhoff | H02J 7/0029 | 701/22 |
| 2016/0079775 A1* | 3/2016 | Su | H02J 7/00 | 320/107 |
| 2016/0141892 A1* | 5/2016 | Li | H02J 7/007 | 320/107 |
| 2017/0117727 A1* | 4/2017 | Chen | G06F 1/263 | |
| 2017/0126045 A1* | 5/2017 | Chen | H02M 3/158 | |
| 2017/0203753 A1* | 7/2017 | Imai | B60W 20/15 | |
| 2017/0229902 A1* | 8/2017 | Kamikawa | H02J 7/02 | |
| 2017/0279285 A1* | 9/2017 | Chen | H02J 7/0044 | |
| 2018/0138813 A1* | 5/2018 | Chen | H02M 3/158 | |
| 2018/0205215 A1* | 7/2018 | Su | H02H 3/207 | |
| 2018/0278076 A1* | 9/2018 | Chen | H02M 1/08 | |
| 2018/0321702 A1* | 11/2018 | Chen | G05F 3/262 | |
| 2019/0044345 A1* | 2/2019 | Komiyama | H02J 7/0077 | |
| 2019/0081574 A1* | 3/2019 | Bergquist | H02M 7/49 | |
| 2019/0148955 A1* | 5/2019 | Takenaka | H02J 7/0021 | 320/118 |
| 2019/0149052 A1* | 5/2019 | Gong | H02M 3/33523 | 363/21.07 |
| 2019/0190280 A1* | 6/2019 | Chen | H02M 3/158 | |
| 2019/0222047 A1* | 7/2019 | Chen | H02J 7/007184 | |
| 2019/0305566 A1* | 10/2019 | Hsu | H02M 3/158 | |
| 2019/0334370 A1* | 10/2019 | Kamikawa | H01M 10/425 | |

\* cited by examiner

NON-NARROW VOLTAGE DIRECT CURRENT CHARGER AND CONTROL METHOD THEREOF

BACKGROUND OF THE INVENTION

1. Field of the Invention

The present disclosure relates to a non-narrow voltage direct current (NON-NVDC) charger and a control method thereof, in particular, to a NON-NVDC charger that can enter a supplement mode at an appropriate time and a control method thereof.

2. Description of Related Art

There are many kinds of chargers, and one of them is the non-narrow voltage direct current (NON-NVDC) charger. The principle of the NON-NVDC charger can be briefly described as follows. In one example, as a maximum current that a transformer can provide is 1 A and a current required by an electronic device is 0.6 A, the transformer can provide sufficient energy to the electronic device. At this time, the charger will cut off a switch circuit (i.e., the charger will leave a supplement mode), and will provide a 0.6 A current to the electronic device and a 0.4 A current to a built-in battery through a power-stage circuit.

In another example, if a maximum current that the transformer can provide is 1 A and the current required by the electronic device is 1.5 A, the transformer cannot provide sufficient current to the electronic device. At this time, the voltage of the electronic device will drop. When the voltage of the built-in battery of the charger is higher than the voltage of the electronic device, the charger turns on the switch circuit (i.e., the charger will enter the supplement mode) and then the built-in battery of the charger provides the current required by the electronic device through the switch circuit. In short, in addition to the 1 A current provided by the transformer, a 0.5 A current is provided by the built-in battery of the charger, and thus the 1.5 A current required by the electronic device can be satisfied.

According to the above, the leaving or entering the supplement mode of the NON-NVDC charger is related to the switch circuit, or more specifically, to the turn-on voltage of the switch circuit, which is related to the turn-on resistance value of the switch circuit and the current flowing through the switch circuit. When the turn-on voltage of the switch circuit is too low, the charger may enter and leave the supplement mode repeatedly so that the charger will not work stably to result in poor operation efficiency when the current flowing through the transformer is close to a maximum safe current. As a result, the charger cannot stably provide the current required by the electronic device. On the other hand, when the turn-on voltage of the switch circuit is too high, the charger may also have poor operation efficiency. However, the above problems can be solved if the turn-on voltage of the switch circuit is optimized.

SUMMARY OF THE INVENTION

The present disclosure provides a non-narrow voltage direct current (NON-NVDC) charger and a control method thereof. In the present disclosure, a target voltage, related to a turn-on voltage of a switch circuit, is optimized in advance. Then, according to the optimized target voltage, the NON-NVDC charger can enter a supplement mode at an appropriate time, operate stably and have great operation efficiency even when the current flowing through the transformer is close to a maximum safe current.

The NON-NVDC charger provided by the present disclosure includes a transformer, a switch circuit, a power-stage circuit and a switch controller. The transformer provides an input current according to a system current of a load. The switch circuit is coupled between the load and an energy storage device. One end of the power-stage circuit is coupled to the transformer and the load and another end of the power-stage circuit is coupled to the energy storage device. The switch controller is coupled between the switch circuit, the load and the energy storage device. The switch controller sets a target voltage, calculates a voltage difference between a storage voltage of the energy storage device and the target voltage, and determines whether the voltage difference is higher than an output voltage of the load. The target voltage is related to the output voltage of the load, the storage voltage and a turn-on resistance value. The switch controller turns on the switch circuit and the NON-NVDC charger enters a full-on supplement mode among supplement modes when the voltage difference is higher than the output voltage of the load and a comparison voltage between the voltage difference and the output voltage of the load is higher than the target voltage. In addition, when the voltage difference is higher than the output voltage of the load and the comparison voltage between the voltage difference and the output voltage of the load is lower than or equal to the target voltage, the switch controller turns on the switch circuit and the NON-NVDC charger enters a linear supplement mode among the supplement modes. Moreover, the switch controller turns off the switch circuit and the NON-NVDC charger leaves the supplement mode when the voltage difference is lower than or equal to the output voltage of the load.

In the control method provided by the present disclosure, the NON-NVDC charger includes the switch controller and the switch circuit. The switch circuit is coupled between the load and the energy storage device, and the switch controller is coupled between the load, the energy storage device and the switch circuit. Additionally, the control method includes steps as follows: (A) providing an input current to the load; (B) setting a target voltage through the switch controller, wherein the target voltage is related to the output voltage of the load, the storage voltage and the turn-on resistance value; (C) calculating a voltage difference between the storage voltage and the target voltage; and (D) determining whether the voltage difference is higher than the output voltage of the load. In the step (D), the switch circuit is turned on and the NON-NVDC charger enters the full-on supplement mode among the supplement modes when the voltage difference is higher than the output voltage of the load and the comparison voltage between the voltage difference and the output voltage of the load is higher than the target voltage. In addition, when the voltage difference is higher than the output voltage of the load and the comparison voltage between the voltage difference and the output voltage of the load is lower than or equal to the target voltage, the switch circuit is turned on and the NON-NVDC charger enters the linear supplement mode among the supplement modes. Moreover, the switch circuit is turned off and the NON-NVDC charger leaves the supplement mode when the voltage difference is lower than or equal to the output voltage of the load.

To sum up, in the NON-NVDC charger and the control method provided by the present disclosure, a proper target voltage, related to the turn-on voltage of the switch circuit, can be determined according to the output voltage of the load, the storage voltage of the energy storage device and the turn-on resistance value of the switch circuit. Then, according to the determined target voltage, the NON-NVDC charger can enter the supplement mode at the appropriate time, the NON-NVDC charger can operate stably and have great operation efficiency even when the current flowing through the transformer is close to the maximum safe current.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

In the present disclosure, a proper target voltage can be determined according to an output voltage of a load, a storage voltage of an energy storage device and a turn-on resistance value of a switch circuit. When a voltage difference between the storage voltage and the target voltage is higher than the output voltage of the load, the NON-NVDC charger enters a supplement mode. On the other hand, when the voltage difference between the storage voltage and the target voltage is lower than or equal to the output voltage of the load, the NON-NVDC charger leaves the supplement mode.

In the supplement mode, if a comparison voltage between the voltage difference and the output voltage of the load is higher than the target voltage, it indicates that the turn-on voltage of the switch circuit is lower than the target voltage. In this case, the NON-NVDC charger operates in a linear supplement mode. However, if a comparison voltage between the voltage difference and the output voltage of the load is lower than or equal to the target voltage, it indicates that the turn-on voltage of the switch circuit is higher than or equal to the target voltage. In this case, the NON-NVDC charger operates in a full-on supplement mode. In this manner, according to the determined target voltage, the NON-NVDC charger can enter the supplement mode at an appropriate time, such that the NON-NVDC charger can operate more stably and operation efficiency of the NON-NVDC charger can be improved and the current flowing through the transformer will not be close to a maximum safe current.

Figure 1:
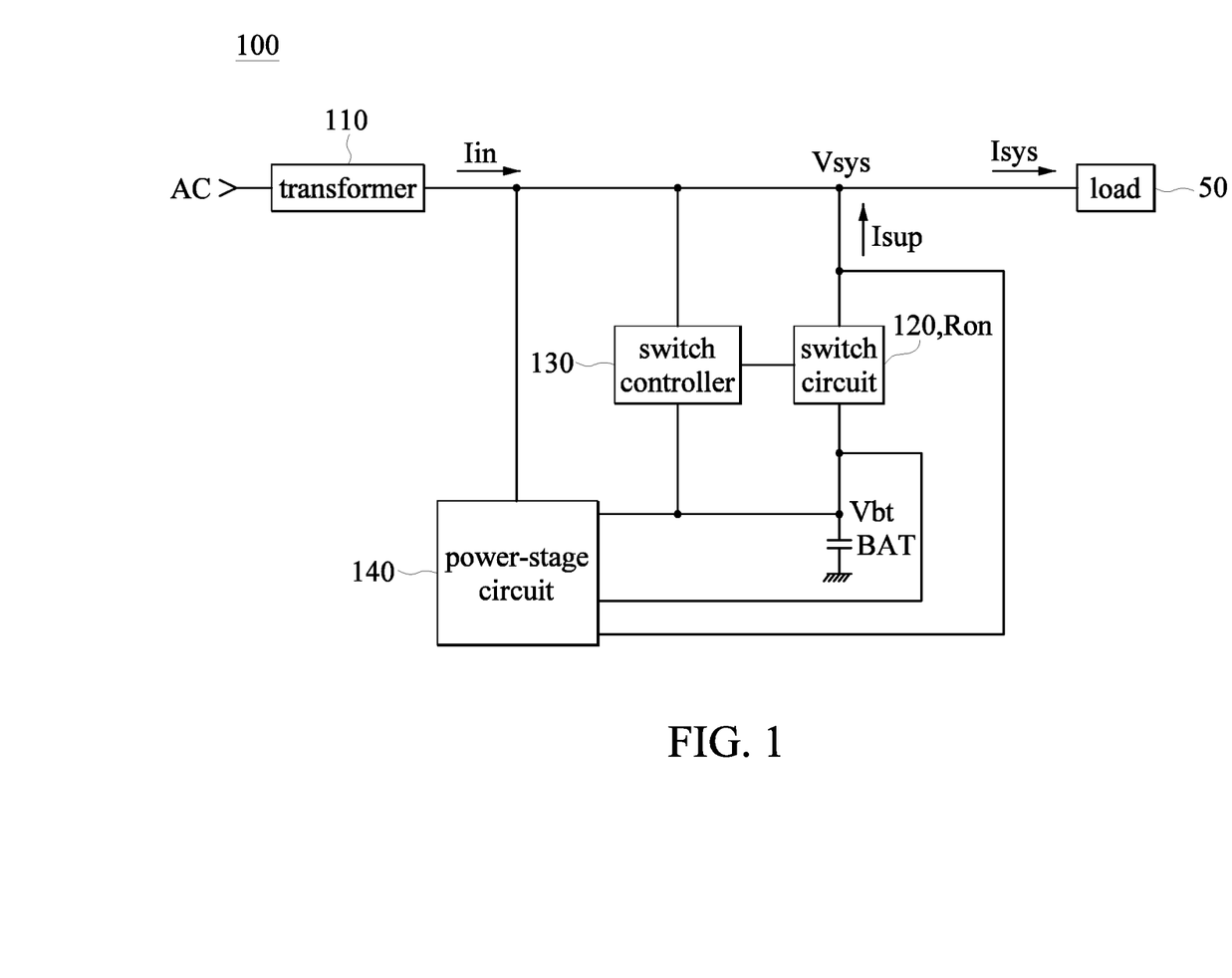
FIG. 1 shows a schematic diagram of a NON-NVDC charger according to an embodiment of the present disclosure.

Referring to FIG. 1, a schematic diagram of a NON-NVDC charger according to an embodiment of the present disclosure is shown. A NON-NVDC charger 100 can receive a utility power AC, converts it to electrical energy and stores the electrical energy in an energy storage device BAT, or the NON-NVDC charger 100 can provide the electrical energy to a load 50. For example, the energy storage device BAT can be a battery that can store the received electrical energy or convert the stored electrical energy to be used by the load 50. The load 50 can be a cell phone, a tablet, a music player, a video player or the like, which is not limited thereto.

As shown in FIG. 1, the NON-NVDC charger 100 includes a transformer 110, a switch circuit 120, a switch controller 130 and a power-stage circuit 140. The transformer 110 may include proper circuits, logics and/or codes that may receive the utility power AC, and increase or reduce the utility power AC based on the Faraday's law of electromagnetic induction to generate an input current Iin. In this manner, the transformer 110 properly provides the input current Iin according to a system current Isys of the load 50.

The switch circuit 120 is coupled between the load 50 and the energy storage device BAT, and is controlled by the switch controller 130. When the switch controller 130 turns on the switch circuit 120, the energy storage device BAT provides a storage current Isup to the load 50 through the switch circuit 120. One the other hand, when the switch controller 130 turns off the switch circuit 120, no storage current Isup is provided to the load 50. For example, the switch circuit 120 can be a switch circuit including PMOS transistors, NMOS transistors or other circuit elements, which is not limited thereto. The relationships among the switch circuit 120, the switch controller 130 and the power-stage circuit 140 will be illustrated in the following descriptions.

One end of the power-stage circuit 140 is coupled to the transformer 110 and the load 50, and another end of the power-stage circuit 140 is coupled to the energy storage device BAT. The power-stage circuit 140 determines whether a storage voltage Vbt is higher than a output voltage Vsys. When the storage voltage Vbt is lower than or equal to the output voltage Vsys, the power-stage circuit 140 operates in a charging mode. In this case, the load 50 and the energy storage device BAT both obtain energy from the input current Iin of the transformer 110. When the energy storage device BAT is full, only the load 50 obtains power from the input current Iin of the transformer 110. When the storage voltage Vbt is higher than the output voltage Vsys, the power-stage circuit 140 operates in a stop-charging mode. Then, the switch controller 130 will further determines whether the NON-NVDC charger 100 enters a supplement mode or leaves the supplement mode according to the output voltage Vsys and the storage voltage Vbt.

Figure 2:
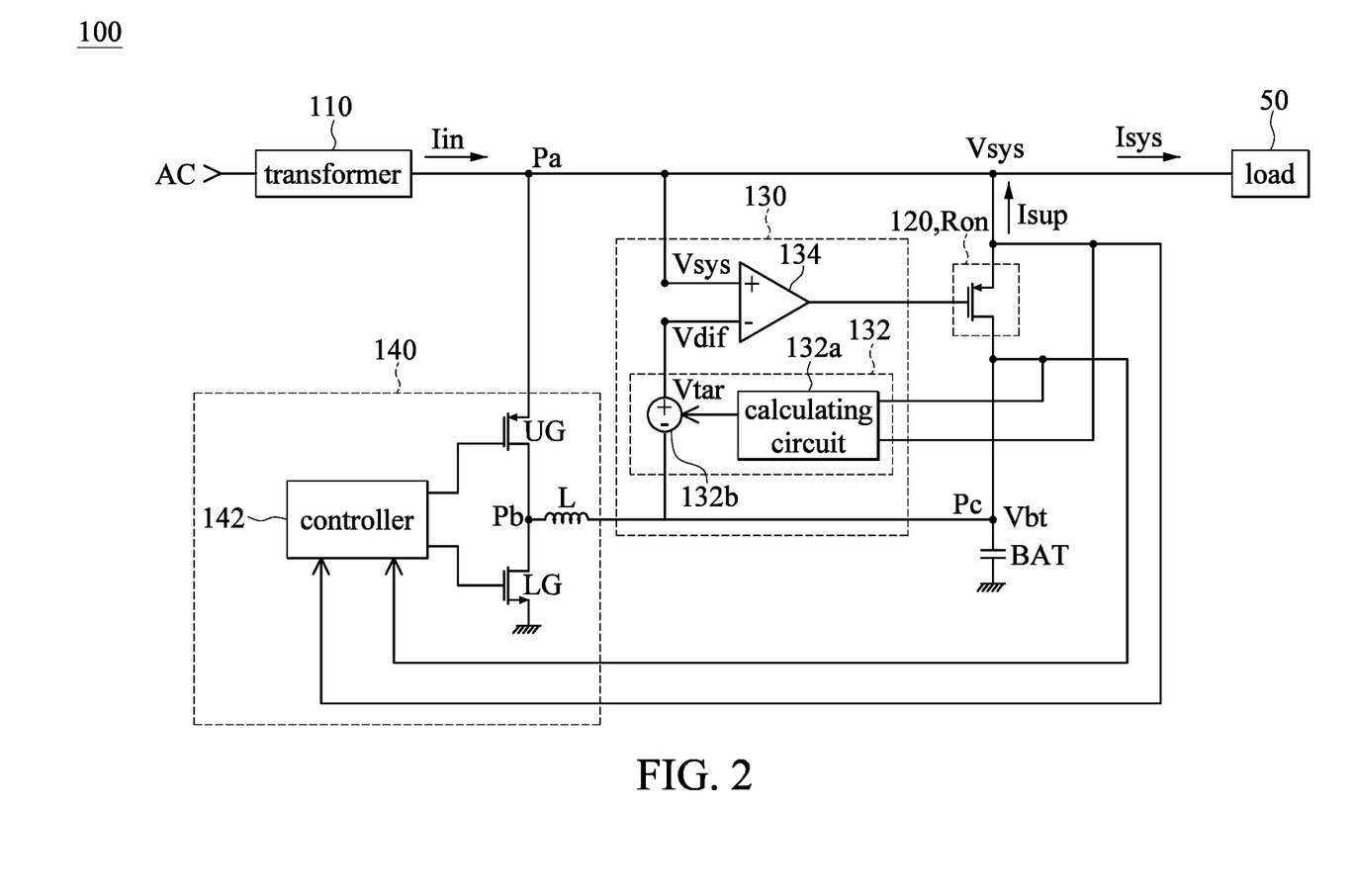
FIG. 2 shows a circuit diagram of a NON-NVDC charger according to an embodiment of the present disclosure.

Referring to FIG. 2, a circuit diagram of a NON-NVDC charger according to an embodiment of the present disclosure is shown. The power-stage circuit 140 includes a controller 142, an upper-side switch UG, a lower-side switch LG and an inductor L. One end of the upper-side switch UG is coupled to a node Pa between the transformer 110 and the load 50. Another end of the upper-side switch UG is coupled to one end of the lower-side switch LG, and another end of the lower-side switch LG is grounded. A control end of the upper-side switch UG and a control end of the lower-side switch LG are coupled to the controller 142, and the upper-side switch UG and the lower-side switch LG are controlled by the controller 142. One end of the inductor L is coupled to a node Pb between the upper-side switch UG and the lower-side switch LG, and the other end of the inductor L is coupled to a node Pc between the energy storage device BAT and the switch circuit 120. In this embodiment, the upper-side switch UG is a PMOS transistor, and the lower-side switch LG is an NMOS transistor, which is not limited thereto. In other embodiments, the upper-side switch UG may be an NMOS transistor or other kind of transistor, and the lower-side switch LG may be a PMOS transistor or other kind of transistor.

The controller 142 receives the output voltage Vsys and the storage voltage Vbt to determine whether the storage voltage Vbt is higher than the output voltage Vsys. When the controller 142 determines that the storage voltage Vbt is lower than or equal to the output voltage Vsys, it indicates that the electrical energy required by the load 50 can be sufficiently supplied by the transformer 110. In this case, the power-stage circuit 140 operates in the charging mode. On the other hand, when the controller 142 determines that the storage voltage Vbt is higher than the output voltage Vsys, it indicates that the electrical energy required by the load 50 cannot be sufficiently supplied by the transformer 110. In this case, the power-stage circuit 140 operates in the stop-charging mode. Then, the switch controller 130 will further determine whether the NON-NVDC charger 100 enters the supplement mode or leaves the supplement mode according to the output voltage Vsys and the storage voltage Vbt.

According to FIG. 1 and FIG. 2, the switch controller 130 is coupled to the switch circuit 120, the load 50 and the energy storage device BAT. A target voltage Vtar is set by the switch controller 130, and the target voltage Vtar is related to the output voltage Vsys of the load 50, the storage voltage Vbt of the energy storage device BAT and a turn-on resistance value Ron of the switch circuit 120.

The target voltage Vtar is related to the turn-on voltage of the switch circuit 120, so that the target voltage Vtar will be affected by the turn-on and the turn-off of the switch circuit 120. When the target voltage Vtar is set at a low voltage and the storage voltage Vbt is close to the output voltage Vsys, the switch circuit 120 may be easily turned on or turned off by the switch controller 130, so that the NON-NVDC charger 100 may enter and leave the supplement mode repeatedly. However, when the target voltage Vtar is set at a high voltage and the storage voltage Vbt is much higher than the output voltage Vsys, the switch circuit 120 will be turned on. In this case, since the storage voltage Vbt needs to be much higher than the output voltage Vsys to turn on the switch circuit 120, a power loss would be caused and decrease the operation efficiency of the NON-NVDC charger 100. To avoid the above issues, in this embodiment, a proper target voltage Vtar of the switch circuit 120 is stored in the switch controller 130 in advance, and the turn-on voltage of the switch circuit 120 will be set as the proper target voltage Vtar.

Figure 3:
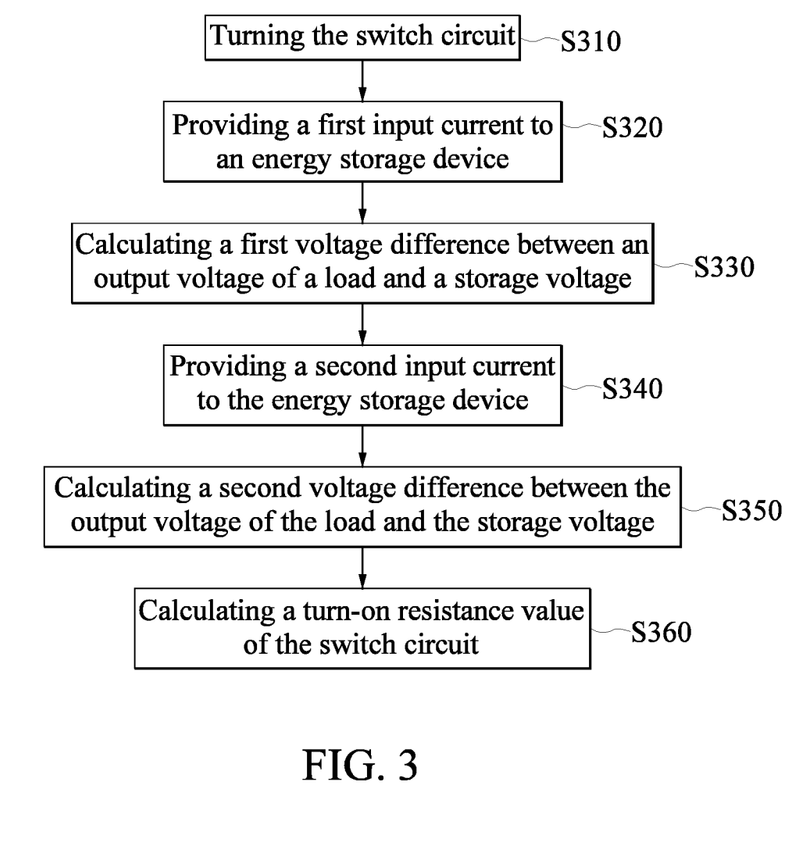
FIG. 3 is a flow chart showing how a turn-on resistance value of a switch circuit is determined according to an embodiment of the present disclosure.

The switch controller 130 calculates the turn-on resistance value of the switch circuit 120 in advance. As the switch controller 130 calculates the turn-on resistance value of the switch circuit 120, the power-stage circuit 140 stops operating. Specifically, the switch controller 130 executes the following steps to calculate the turn-on resistance value of the switch circuit 120. Referring to FIG. 3, in step S310, the switch controller 130 turns on the switch circuit 120. After that, in steps S320 and S330, when the transformer 110 provides a first input current I1 to the energy storage device BAT, the switch controller 130 calculates a first voltage difference V1 between the output voltage Vsys and the storage voltage Vbt. Then, in steps S340 and S350, when the transformer 110 provides a second input current I2 to the energy storage device BAT, the switch controller 130 calculates a second voltage difference V2 between the output voltage Vsys and the storage voltage Vbt. Finally, in step S360, the switch controller 130 calculates the turn-on resistance value of the switch circuit 120 according to the first input current I1, the second input current I2, the first voltage difference V1 and the second voltage difference V2. The steps described above are executed by the switch controller 130 to set the proper target voltage Vtar.

According to FIG. 2, in addition to setting the target voltage Vtar, the switch controller 130 also calculates a voltage difference Vdif between the storage voltage Vbt and the target voltage Vtar, and then determines whether the voltage difference Vdif is higher than the output voltage Vsys of the load. When the voltage difference Vdif is higher than the output voltage Vsys of the load and a comparison voltage between the voltage difference Vdif and the output voltage Vsys of the load is higher than the target voltage Vtar, the switch controller 130 turns on the switch circuit 120 and the NON-NVDC charger enters the full-on supplement mode which is one of the supplement modes of the NON-NVDC charger. On the other hand, when the voltage difference Vdif is higher than the output voltage Vsys of the load and the comparison voltage between the voltage difference Vdif and the output voltage Vsys of the load is lower than or equal to the target voltage Vtar, the switch controller 130 also turns on the switch circuit 120 and NON-NVDC charger enters a linear supplement mode which is another of the supplement modes of the NON-NVDC charger. In addition, when the voltage difference Vdif is lower than or equal to the output voltage Vsys of the load, the switch controller 130 turns off the switch circuit 120 and the NON-NVDC charger leaves the supplement mode.

The switch controller 130 includes a limiter 132 and a comparator 134. The limiter 132 is coupled between the load 50, the energy storage device BAT and the power-stage circuit 140. The limiter 132 calculates the voltage difference Vdif by subtracting the target voltage Vtar from the storage voltage Vbt. The limiter 132 includes a calculating circuit 132a and a variable voltage source 132b. The calculating circuit 132a calculates a current flowing through the switch circuit 120 according to the turn-on resistance value Ron and a voltage difference between the output voltage Vsys of the load 50 and the storage voltage Vbt. For example, the difference between the output voltage Vsys of the load 50 and the storage voltage Vbt divided by the turn-on resistance value Ron equals the current flowing through the switch circuit 120. The variable voltage source 132b is coupled to the calculating circuit 132a and the energy storage device BAT. The variable voltage source 132b adjusts the target voltage Vtar according to the current flowing through the switch circuit 120 to generate the voltage difference Vdif between the storage voltage Vbt of the energy storage device BAT and the target voltage Vtar. It should be noted that, the circuit structure (e.g., circuit elements) of the limiter 132 is not restricted by the present disclosure.

The comparator 134 is coupled to the load 50, the limiter 132 and the switch circuit 120. The comparator 134 receives the output voltage Vsys of the load 50 and the voltage difference Vdif between the storage voltage Vbt of the energy storage device BAT, and determines whether the voltage difference Vdif is higher than the output voltage Vsys. When the voltage difference Vdif is higher than the output voltage Vsys, the comparator 134 turns on the switch circuit 120. On the other hand, when the the voltage difference Vdif is lower than or equal to the output voltage Vsys, the comparator 134 turns off the switch circuit 120.

There is an example to describe how the comparator 134 turns on or turns off the switch circuit 120. In this example, a positive end of the comparator 134 is coupled to the load 50, a negative end of the comparator 134 is coupled to the limiter 132, and an output end of the comparator 134 is coupled to the switch circuit 120 implemented by a PMOS transistor. When the voltage difference Vdif between the storage voltage Vbt of the energy storage device BAT is higher than the output voltage Vsys of the load 50, the comparator 134 generates a low-level signal and transmits the signal to the switch circuit 120. Since the switch circuit 120 is a PMOS transistor, it turns on according to the low-level signal. On the other hand, when the voltage difference Vdif between the storage voltage Vbt of the energy storage device BAT is lower than or equal to the output voltage Vsys of the load 50, the comparator 134 generates a high-level signal and transmits the signal to the switch circuit 120. Then, the switch circuit 120 turns off according to the high-level signal.

Figure 4:
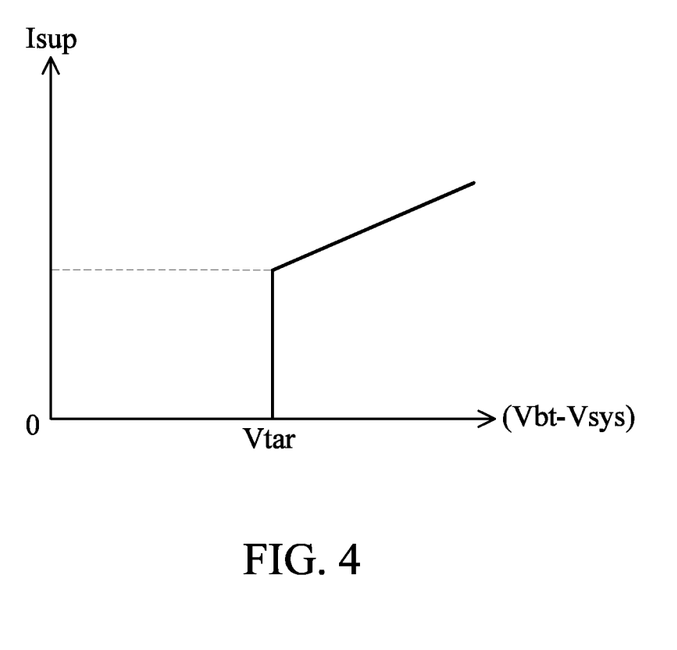
FIG. 4 is a curve diagram showing relationships between an output voltage of a load, a storage voltage and a storage current according to an embodiment of the present disclosure.

FIG. 4 is a curve diagram showing relationships between an output voltage of a load, a storage voltage and a storage current according to an embodiment of the present disclosure. As shown by FIG. 4, when the switch controller 130 determines that the voltage difference Vdif between the storage voltage Vbt of the energy storage device BAT is higher than the output voltage Vsys of the load 50 and the comparison voltage between the voltage difference Vdif and the output voltage Vsys of the load 50 is higher than the target voltage (i.e., the voltage difference between the storage voltage Vbt and the output voltage Vsys is higher than the target voltage Vtar), the switch circuit 120 is fully turned on and the NON-NVDC charger enters the full-on supplement mode which is one of the supplement modes of the NON-NVDC charger. However, when the switch controller 130 determines that the voltage difference Vdif between the storage voltage Vbt of the energy storage device BAT is higher than the output voltage Vsys of the load 50 and the comparison voltage between the voltage difference Vdif and the output voltage Vsys of the load 50 is lower than or equal to the target voltage (i.e., the voltage difference between the storage voltage Vbt and the output voltage Vsys is lower than or equal to the target voltage Vtar), the switch circuit 120 is linearly turned on and the NON-NVDC charger enters the linear supplement mode which is one of the supplement modes of the NON-NVDC charger. In the supplement mode, the load 50 receives both of the input current Iin and the storage current Isup. The higher the voltage difference between the storage voltage Vbt and the output voltage Vsys is, the higher the storage current Isup will be. After the NON-NVDC charger leaves the supplement mode, the storage current Isup becomes zero and the load 50 can only receive the input current Iin.

Figure 5:
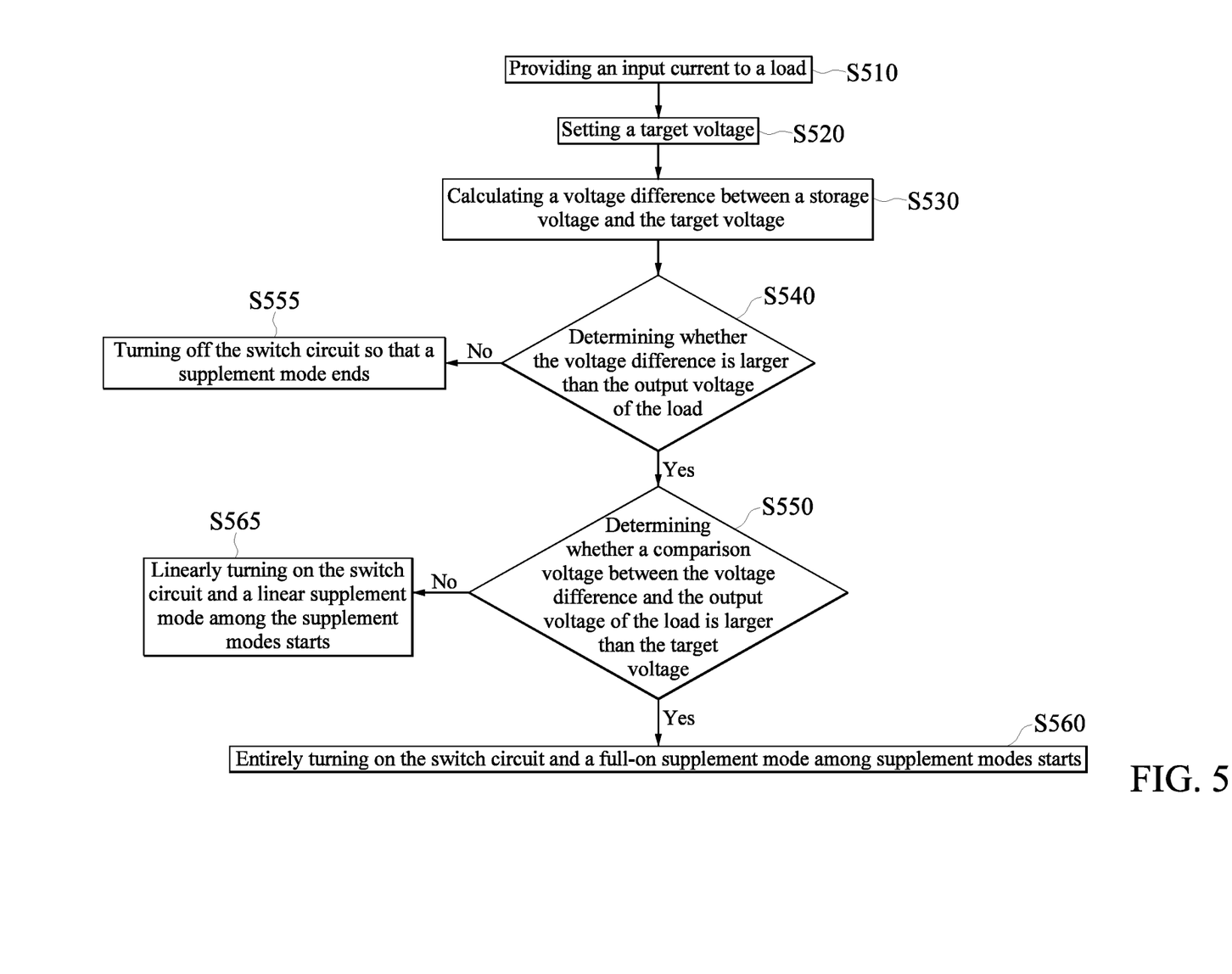
FIG. 5 shows a flow chart of a control method of a NON-NVDC charger according to an embodiment of the present disclosure.

From the above, the present disclosure also provides a control method that is used in the NON-NVDC charger 100 in the above embodiment, and this control method can be illustrated by FIG. 1, FIG. 2 and FIG. 5. In step S510, the NON-NVDC charger 100 provides the input current Iin to the load 50. Then, in step S520, the NON-NVDC charger 100 sets the target voltage Vtar via the switch controller 130. After that, is step S530, the NON-NVDC charger 100 calculates the voltage difference Vdif between the storage voltage Vbt of the energy storage device BAT and the target voltage Vtar. Finally, the NON-NVDC charger 100 determines whether the voltage difference Vdif is higher than an output voltage Vsys of the load 50.

When the voltage difference Vdif is higher than the output voltage Vsys, the NON-NVDC charger 100 enters the supplement mode. Then, the NON-NVDC charger 100 further determines whether the comparison voltage between the voltage difference Vdif and the output voltage Vsys is higher than the target voltage Vtar, which is the step S550. However, when the voltage difference Vdif is lower than or equal to the output voltage Vsys, the NON-NVDC charger 100 turns off the switch circuit 120 to leave the supplement mode, which is in step S555.

When the NON-NVDC charger 100 determines that the comparison voltage is higher than the target voltage Vtar in step S550, the NON-NVDC charger 100 executes step S560 to completely turn on the switch circuit 120 and thus the NON-NVDC charger 100 enters the full-on supplement mode which is one of supplement modes of the NON-NVDC charger 100. On the other hand, when the NON-NVDC charger 100 determines that the comparison voltage is lower than or equal to the target voltage Vtar, in step S550, the NON-NVDC charger 100 executes step S565 to linearly turn on the switch circuit 120 and thus the NON-NVDC charger 100 enters the linear supplement mode which is another of supplement modes of the NON-NVDC charger 100. Details about steps S510 to S565 are described in the above embodiment of the NON-NVDC charger, and thus the repeated descriptions are omitted herein.

To sum up, in the NON-NVDC charger and the control method provided by the present disclosure, the proper target voltage, related to the turn-on voltage of a switch circuit, can be determined according to the output voltage of the load, the storage voltage of the energy storage device and the turn-on resistance value of the switch circuit. Then, according to the determined target voltage, the NON-NVDC charger can enter the supplement mode at the appropriate time, the NON-NVDC charger can operate stably and have great operation efficiency even when the current flowing through the transformer is close to the maximum safe current.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A non-narrow voltage direct current charger, comprising:
    a transformer, providing an input current according to a system current of a load;
    a switch circuit, coupled between the load and an energy storage device;

a power-stage circuit, wherein one end of the power-stage circuit is coupled to the transformer and the load and another end of the power-stage circuit is coupled to the energy storage device; and a switch controller, coupled to the switch circuit, the load and the energy storage device, to set a target voltage, to calculate a voltage difference between a storage voltage of the energy storage device and the target voltage, and to determine whether the voltage difference is higher than an output voltage of the load, wherein the target voltage is related to the output voltage of the load, the storage voltage and a turn-on resistance value;

wherein the switch controller turns on the switch circuit so that the NON-NVDC charger enters a full-on supplement mode among supplement modes when the voltage difference is higher than the output voltage of the load and a comparison voltage between the voltage difference and the output voltage of the load is higher than the target voltage, and the switch controller turns on the switch circuit so that the NON-NVDC charger enters a linear supplement mode among the supplement modes when the voltage difference is higher than the output voltage of the load and the comparison voltage between the voltage difference and the output voltage of the load is lower than or equal to the target voltage.

2. The NON-NVDC charger according to claim 1, wherein the switch controller turns off the switch circuit to leave the supplement mode when the voltage difference is lower than or equal to the output voltage of the load.

3. The NON-NVDC charger according to claim 1, wherein the power-stage circuit determines whether the storage voltage is higher than the output voltage of the load, the power-stage circuit enters a charging mode when the storage voltage is higher than the output voltage of the load, and the power-stage circuit enters a stop-charging mode when storage voltage is lower than or equal to the output voltage of the load.

4. The NON-NVDC charger according to claim 1, wherein in the supplement mode, the load simultaneously receives the input current and a storage current of the energy storage device.

5. The NON-NVDC charger according to claim 1, wherein the switch controller stores the turn-on resistance value of the switch circuit.

6. The NON-NVDC charger according to claim 1,
wherein the switch controller calculates the turn-on resistance value of the switch circuit, and the power-stage circuit stops working when the switch controller is calculating the turn-on resistance value, and the switch controller;
wherein the switch controller turns on the switch circuit to:
calculate a first voltage difference between the output voltage of the load and the storage voltage when the transformer is providing a first input current to the energy storage device;
calculate a second voltage difference between the output voltage of the load and the storage voltage when the transformer is providing a second input current to the energy storage device; and
calculate the turn-on resistance value of the switch circuit according to the first input current, the second input current, the first voltage difference and the second voltage difference.

7. The NON-NVDC charger according to claim 1, wherein the switch controller includes:

a limiter, coupled to the load, the energy storage device and the power-stage circuit, and calculating the voltage difference by subtracting the target voltage from the storage voltage according to the output voltage of the load, the storage voltage and the turn-on resistance value; and a comparator, coupled to the load, the limiter and the switch circuit, and determining whether the voltage difference is higher than the output voltage of the load;

wherein the comparator turns on the switch circuit when the voltage difference is higher than the output voltage of the load, and the comparator turns off the switch circuit when the voltage difference is lower than or equal to the output voltage of the load.

8. The NON-NVDC charger according to claim 7, wherein the limiter includes:
a calculating circuit, calculating a current flowing through the switch circuit according to the turn-on resistance value and a voltage difference between the output voltage of the load and the storage voltage; and
a variable voltage source, coupled to the calculating circuit and the energy storage device, and adjusting the target voltage according to the current flowing through the switch circuit to generate the voltage difference between the storage voltage of the energy storage device and the target voltage.

9. A control method of a NON-NVDC charger, wherein the NON-NVDC charger comprises a switch controller and a switch circuit, the switch circuit is coupled between a load and an energy storage device, the switch controller is coupled to the load, the energy storage device and the switch circuit, and the control method comprises:
providing an input current to the load;
setting a target voltage through the switch controller, wherein the target voltage is related to an output voltage of the load, a storage voltage of the energy storage device and a turn-on resistance value of the switch circuit;
calculating a voltage difference between the storage voltage and the target voltage; and
determining whether the voltage difference is higher than the output voltage of the load;
wherein the switch circuit is turned on and the NON-NVDC charger enters a full-on supplement mode among supplement modes when the voltage difference is higher than the output voltage of the load and a comparison voltage between the voltage difference and the output voltage of the load is higher than the target voltage, and the switch circuit is turned on and the NON-NVDC charger enters a linear supplement mode among the supplement modes when the voltage difference is higher than the output voltage of the load and the comparison voltage between the voltage difference and the output voltage of the load is lower than or equal to the target voltage.

10. The control method according to claim 9, wherein the switch circuit is turned off to leave the supplement mode when the voltage difference is lower than or equal to the output voltage of the load.

11. The control method according to claim 9, wherein steps of setting the target voltage include:
calculating a current flowing through the switch circuit according to the turn-on resistance value and a voltage difference between the output voltage of the load and the storage voltage; and
setting the target voltage according to the current flowing through the switch circuit.

12. The control method according to claim 9, wherein before providing the input current to the load, the control method further comprises:
  calculating the turn-on resistance value of the switch circuit;
  wherein the step of calculating the turn-on resistance value of the switch circuit further includes:
    turning on the switch circuit through the switch controller;
    calculating a first voltage difference between the output voltage of the load and the storage voltage when a first input current is provided to the energy storage device;
    calculating a second voltage difference between the output voltage of the load and the storage voltage when a second input current is provided to the energy storage device; and
    calculating the turn-on resistance value of the switch circuit according to the first input current, the second input current, the first voltage difference and the second voltage difference.

* * * * *